(12) United States Patent
Pullmann et al.

(10) Patent No.: US 10,896,794 B2
(45) Date of Patent: Jan. 19, 2021

(54) CIRCUIT ARRANGEMENT FOR OPERATING AT LEAST ONE RELAY

(71) Applicant: Pilz GmbH & Co. KG, stfildern (DE)

(72) Inventors: Jürgen Pullmann, Ostfildern (DE);
Bernd Neuschwander, Ostfildern (DE);
Frieder Scharpf, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 269 days.

(21) Appl. No.: 15/893,332

(22) Filed: Feb. 9, 2018

(65) Prior Publication Data

US 2018/0233312 A1    Aug. 16, 2018

(30) Foreign Application Priority Data

Feb. 10, 2017 (DE) .......................... 10 2017 102 637

(51) Int. Cl.
*H01H 47/02* (2006.01)
*H01H 47/32* (2006.01)
(Continued)

(52) U.S. Cl.
CPC ............. *H01H 47/02* (2013.01); *G01P 15/18* (2013.01); *H01H 47/002* (2013.01);
(Continued)

(58) Field of Classification Search
CPC ...... H01H 47/02; H01H 47/325; H01H 47/04; H01H 47/002; H01H 47/22; H01H 47/32;
(Continued)

(56) References Cited

U.S. PATENT DOCUMENTS

| 6,317,308 B1 | 11/2001 | Durif et al. | |
| 6,560,088 B1 * | 5/2003 | Beck | F01L 9/04 251/129.01 |

(Continued)

FOREIGN PATENT DOCUMENTS

| DE | 19712721 A1 | 10/1998 |
| DE | 102006061882 A1 | 7/2007 |

(Continued)

OTHER PUBLICATIONS

Search Report in corresponding European Application No. 18151055.3, dated Jun. 13, 2018, with English translation.

*Primary Examiner* — Dharti H Patel
(74) *Attorney, Agent, or Firm* — Edell, Shapiro & Finnan, LLC.

(57) ABSTRACT

A circuit arrangement comprises: an electronic switch; at least one relay including a relay coil; a shunt resistor; a voltage supply device to supply an operating voltage to the at least one relay, wherein the electronic switch, the relay coil of the at least one relay, and the shunt resistor are electrically connected in series to one another between the operating voltage and ground; a current regulator to drive the electronic switch with a pulse width modulation to adjust a control current that flows through the relay coil; at least one sensor to generate sensor data indicative of shocks, impacts or vibrations acting on the at least one relay; and an evaluating unit to evaluate the sensor data, wherein the current regulator is configured to adjust the control current based on the sensor data evaluated by the evaluating unit.

11 Claims, 1 Drawing Sheet

(51) Int. Cl.
*H01H 47/04* (2006.01)
*G01P 15/18* (2013.01)
*H01H 47/00* (2006.01)
*H01H 47/22* (2006.01)
*G01P 15/08* (2006.01)
*G01P 15/14* (2013.01)

(52) U.S. Cl.
CPC ............ *H01H 47/04* (2013.01); *H01H 47/22* (2013.01); *H01H 47/325* (2013.01); *G01P 15/08* (2013.01); *G01P 15/14* (2013.01)

(58) Field of Classification Search
CPC .......... G01P 15/18; G01P 15/08; G01P 15/14; G01P 15/105
USPC ........................................................ 361/153
See application file for complete search history.

(56) References Cited

U.S. PATENT DOCUMENTS

| | | |
|---|---|---|
| 2011/0080685 A1 | 4/2011 | Wellner et al. |
| 2013/0009464 A1 | 1/2013 | Firehammer et al. |
| 2017/0221033 A1* | 8/2017 | Mochizuki ............ G06Q 20/20 |

FOREIGN PATENT DOCUMENTS

| | | |
|---|---|---|
| DE | 102008018260 A1 | 10/2009 |
| DE | 102011079547 A1 | 1/2013 |
| EP | 2897150 A1 | 7/2015 |
| WO | 2012069869 A1 | 5/2012 |

* cited by examiner

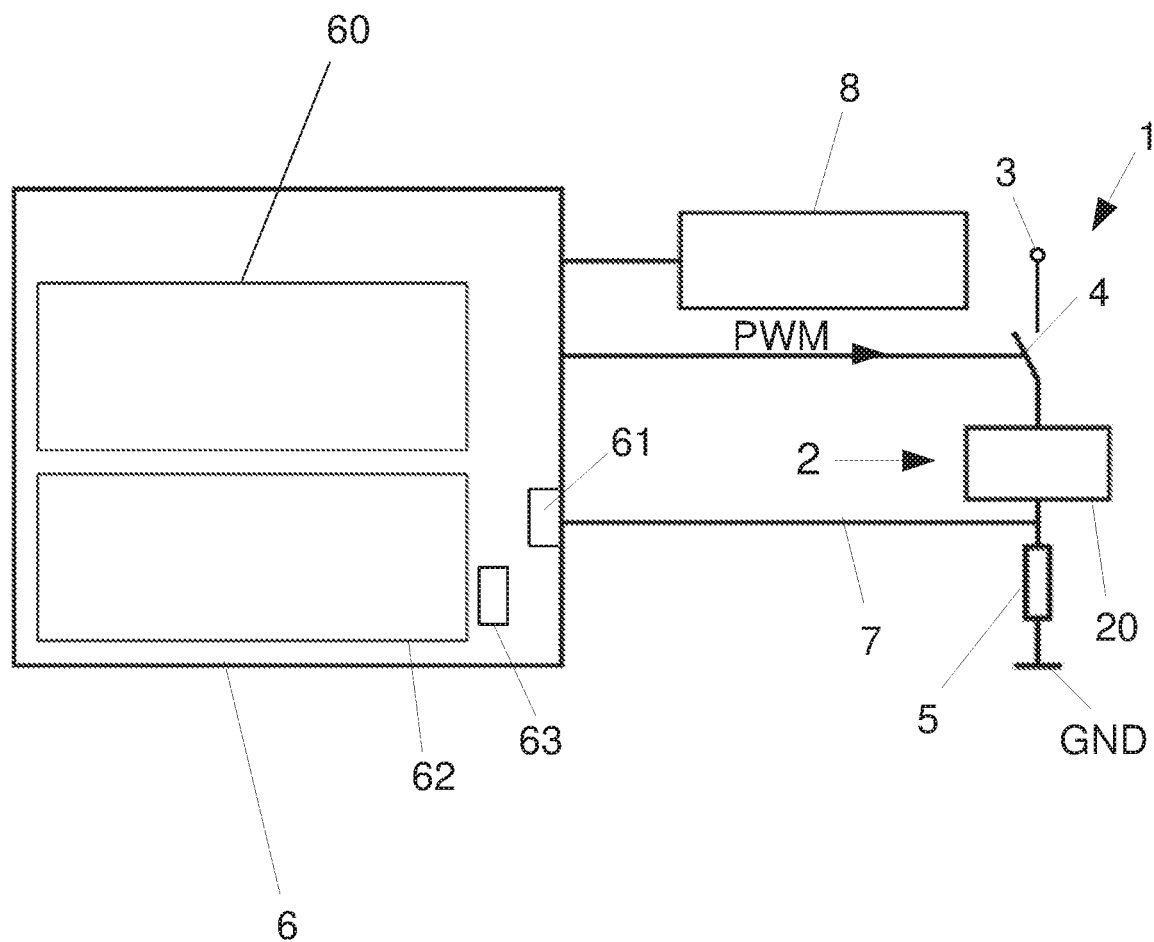

CIRCUIT ARRANGEMENT FOR OPERATING AT LEAST ONE RELAY

CROSS REFERENCE TO RELATED APPLICATIONS

This application claims foreign priority under 35 U.S.C. § 119(a)-(d) to Application No. DE 102017102637.1 filed on Feb. 10, 2017, the entire contents of which are hereby incorporated by reference.

TECHNICAL FIELD

The present disclosure relates to a circuit arrangement for operating at least one relay, the circuit arrangement comprising: a voltage supply device, which can make an operating voltage available to the at least one relay; an electronic switch and a shunt resistor, a relay coil of the at least one relay and the shunt resistor being electrically connected in series to one another between the operating voltage and ground; and a current regulator configured to drive the electronic switch, in particular, with a pulse width modulation and can adjust a control current, which flows through the relay coil.

BACKGROUND

Relays are, as well-known, electromagnetic switches. Such relays, which are known in a wide variety of embodiments from the prior art, lend themselves well to a multitude of technical applications and can also be used, for example, in safety switching devices. A relay comprising a relay coil, which has a ferromagnetic core, is connected to a circuit arrangement, and can be supplied with a control current by the circuit arrangement. Furthermore, a relay comprises a moveable, ferromagnetic armature and one or more relay contacts, which are coupled to the armature. In operation, an electric current flows through the relay coil, which in turn generates a magnetic flux via the ferromagnetic core. As a result, the armature attracts and switches the relay contacts that are coupled to the armature. The armature in turn is coupled to a reset spring, which is designed to transfer the armature into its initial position via a spring force, when the relay coil is no longer traversed by the electric control current. In the practical application, a distinction is made between the so-called idle current relay and a working current relay. An idle current relay is characterized by the feature that in its quiescent state the electric current flows through the relay coil, and the armature is attracted. An idle current relay can be used, for example, to monitor a mains power failure or a wire breakage. In contrast, a working current relay is at zero current in its quiescent state.

Safety switching devices are designed at the present time in accordance with the IEC standard 1131 for an electric operating voltage at an interval ranging from 24 V+10% (so-called overvoltage) down to 24 V−15% (so-called undervoltage). Therefore, in the event of an undervoltage there is still an electric operating voltage of 24 V−15%=20.4 V. Usually relays, which are operated at a relay voltage of 18 V to 20 V, are used in the electric circuits of safety switching devices.

One fundamental disadvantage of a relay consists of the fact that it is relatively sensitive to impacts, vibrations or any other shocks. In the event of an undervoltage the safety switching devices, which are equipped with at least one relay, have to be designed by circuit technology for any impacts, shocks and vibrations, so that an unintentional opening of the relay contacts is not possible. For this purpose a high electric holding power is necessary in order to provide a sufficiently high force, so that the armature can hold the relay contacts in the closed position, even in the event of shocks.

At a typical operating voltage of 24 V the electric holding power is increased, because the higher voltage also causes more current to flow through the relay coil. At an overvoltage of 24 V+10%=26.4 V an even higher current flows through the relay coil, so that a large amount of waste heat is generated owing to the power loss that occurs.

In the case of a large technical system with long electrical supply lines it is often the case that a higher voltage is set, in order to ensure that the electric consumers that are installed even at the far end of the technical system do not have an undervoltage. In this case, the switching cabinet has a slight overvoltage, which leads to enormous heat losses that are caused by higher currents, insofar as the higher currents are not re-adjusted. For this purpose it may be practical to apply a current regulator. In this case, a holding current of the relay is adjusted, independently of an operating voltage, to the requisite electric excitation current. In this way, the drive power of the relay can be reduced accordingly.

The document US 2006/0007627 A1 discloses an intelligent relay system with at least one relay, a sensor and a controller. This system offers the option of being able to detect external shocks, to which the intelligent relay system can respond accordingly.

SUMMARY

An object of the present invention consists of providing a circuit arrangement for operating at least one relay of the type that is described in the introductory part and that makes it possible to further reduce the electric power loss of the relay and, in so doing, to reduce the waste heat.

The disclosed circuit arrangement is characterized by the feature that the circuit arrangement comprises at least one sensor configured to detect shocks, impacts or vibrations acting on the relay, as well as an evaluating unit for evaluating the sensor data, acquired by the sensor, wherein the current regulator is designed to adjust the control current on the basis of the sensor data, evaluated by the evaluating unit. The relay may be preferably a safety relay with positively driven relay contacts, such as those that can be employed in safety switching devices. The invention proceeds on the idea of acquiring information about potential shocks, impacts, vibrations or any other interference variables, which act on the relay from the outside, and to adjusting, according to specific requirements, the control current, which flows through the relay coil. If the relay is not exposed to any shocks, impacts, vibrations or any other comparable external interference effects, then the risk of a shock-induced dropping off of a relay contact is relatively low, so that the relay can be operated at a low control current; and, in so doing, the power loss can be reduced. If the relay is exposed to corresponding shocks, impacts, vibrations, etc., then the risk of a shock-induced dropping off of a relay contact is greater, so that it is advantageous to operate the relay coil at a higher control current. A dynamic, needs-based adjustment of the control current of the relay coil offers, on the whole, considerable advantages, in order to reduce the power loss of the relay. Studies have shown that a reduction in the control current to as low as 50% of the manufacturer's specification is possible, when shocks, vibrations or similar interference effects, which act on the relay, are permanently detected, and the control current is re-adjusted accordingly. The current regulator forms preferably a closed loop PI controller, in which the cumulative effect of the control deviations leads to the fact that finally the control deviation will become zero. Thus, a closed loop PI controller does not have advantageously any steady-state deviation from setpoint.

Preferably the sensor and the evaluating unit can be integrated into the relay. This feature offers special advantages in terms of installation space. Furthermore, the sensor and the evaluating unit do not have to be installed externally.

In a preferred embodiment it is proposed that the sensor be configured as an acceleration sensor that is designed to detect an acceleration, acting on the at least one relay, in at least one spatial direction. Such a single axis acceleration sensor is sufficient in many cases. The (one) spatial direction can correlate, in particular, to the axis of the relay armature, since the acceleration, acting in this direction, is especially critical. Preferably the acceleration sensor can be a microelectromechanical system (MEMS). For certain applications it is possible to arrange, for example, two relays at right angles to each other. In order to account for this circumstance, the acceleration sensor in a particularly preferred embodiment may be designed to detect the acceleration, acting on the at least one relay, in at least two spatial directions, preferably in three spatial directions. The acceleration sensor can be arranged, in particular, on a printed circuit board of the circuit arrangement (preferably in close spatial proximity of the relay).

In an additional embodiment there is also, for example, the possibility that the acceleration sensor is designed to have nine axes and comprises a gyroscope as well as a magnetometer. This embodiment facilitates a particularly accurate determination of the acceleration acting on the at least one relay.

In a particularly preferred embodiment it is proposed that the acceleration sensor exhibits a scan rate that amounts to no less than 1 kHz, preferably no less than 3 kHz, in particular, no less than 5 kHz. A high scan and data rate enables a fast evaluation of the current operating state of the at least one relay with respect to potential shocks, impacts, vibrations or any other interference effects. In this context it has been demonstrated to be particularly advantageous if the scan rate of the acceleration sensor is no less than 5 kHz. In addition to the current regulator, hardware and software are implemented in the circuit arrangement, where in this case the hardware and software are able to carry out an evaluation at a scan rate of 5 kHz and, thus, every 200 µs, as to be whether a control intervention is required that makes a change in the control current through the relay coil necessary.

Preferably the electronic switch may be a bipolar transistor. This embodiment enables a particularly robust design of the electronic switch.

In an advantageous embodiment it is proposed that the evaluating unit be configured such that it can determine a jerk, prevailing in the region of the relay, by differentiating the measured acceleration values over time. It has been shown that the jerk is a suitable kinematic variable in order to detect the effect on impacts, shocks or vibrations on the at least one relay.

Preferably the current regulator can be designed such that it increases the control current flowing through the relay coil, if $j \geq j_{krit}$, where $j_{krit}$ is a critical threshold value of the jerk. Preferably the critical threshold value of the jerk, which may be different for different types of relays, can be saved in a read only memory such that the critical threshold value can be retrieved.

In a preferred embodiment there is the possibility that the current regulator is designed such that it decrementally decreases the control current flowing through the relay coil, if $j < j_{krit}$. This decremental decrease can be carried out until a minimal control current $I_{Min}$, which also depends on the type of relay, is reached. This minimal control current $I_{Min}$ may be in the range of about 50% of the holding current, specified by the relay manufacturer.

In a particularly preferred embodiment, it can be provided that the relay coil has a coil voltage that is less than half of the operating voltage that is provided by the voltage supply device. For example, a relay having a relay voltage of 9 V can be used. At an operating voltage of 24 V the pulse duty factor (the so-called "duty cycle") of the pulse width modulation is about 30%. Due to the large potential difference between 9 V and 24 V, a control difference leads to high coil currents and, as a result, the new target value of the control current can be reached very fast. In this way the holding power of the relay can be reduced even further in an advantageous fashion. Moreover, a relay coil having a relay voltage of 9 V has even more significant advantages. To date a voltage interruption or a dip in the operating voltage below 16 V had led to a fault in a safety switching device that is equipped with the relay. Now the safety switching device can be properly operated up to a voltage of 10.5 V. Moreover, a relay coil having a coil voltage of 9 V comprises a thicker coil wire that tears much less frequently during a winding operation, with the result that there are advantages during the production thereof. The winding time is much shorter, so that the production costs of the relay also decrease. Moreover, the thicker coil wire is much more cost effective than a coil wire that is designed to be very thin.

BRIEF DESCRIPTION OF THE DRAWINGS

Other features and advantages of the present invention will become apparent from the following description of a preferred exemplary embodiment with reference to the accompanying FIG. 1, which shows in schematic form a highly simplified representation of a circuit arrangement 1, which is designed for driving a relay 2 and is carried out in accordance with a preferred exemplary embodiment of the present invention.

DETAILED DESCRIPTION

The relay 2, which may be, in particular, a safety relay of a safety switching device, comprises in a manner that is well-known from the prior art a relay coil 20 with a ferromagnetic core; a moveable, ferromagnetic armature; as well as one or more relay contacts, which are coupled to the armature. Furthermore, the circuit arrangement 1 comprises a voltage supply device (not shown explicitly herein) that can provide an operating voltage 3. In this exemplary embodiment the voltage supply device delivers an operating voltage 3 in the amount of 24 V (DC). Between the operating voltage 3 and the ground GND an electronic switch 4, the relay coil 20 of the relay 2 and a shunt resistor 5 are electrically connected in series to one another. In this case the relay coil 20 is disposed between the electronic switch 4 and the shunt resistor 5.

The electronic switch 4 is implemented preferably in semiconductor technology. In the present case the electronic switch 4 is a bipolar PNP transistor. The electronic switch 4 in one alternative embodiment may also be designed, for example, as a field effect transistor (FET). Furthermore, the circuit arrangement 1 comprises a control and evaluating unit 6, which is connected to the electronic switch 4. In the present case the control and evaluating unit 6 is designed as a microcontroller.

As an alternative, the control and evaluating unit 6 can also be formed, for example, by a microprocessor, along with the associated periphery.

A current regulator 60 is implemented in the control and evaluating unit 6. This current regulator 60 is designed such that it can drive the electronic switch 4 with a pulse width modulation (PWM), so that a control current, which flows through the relay coil 20, can be adjusted to a defined current value. Between the relay coil 20 and the shunt resistor 5 there is a tap 7, which is connected to an A/D converter 61 of the control and evaluating unit 6. The control and evaluating unit 6—in particular, the current regulator 60 implemented therein—is designed such that the control and evaluating unit can measure by way of the tap 7 the voltage over the shunt resistor 5 and can determine therefrom the control current flowing through the relay coil 20.

By using the above described current regulator 60 it is possible to adjust, in principle the control current, flowing through the relay coil 20, independently of the operating voltage 3 to the nominal value of the holding current for the relay contacts of the relay 2. In this way the electric holding power of the relay 2 can already be reduced in an advantageous way. In this context, however, it is desirable to be able to reduce the electric holding power of the relay 2 even further. However, in this case there is the problem that the relay contacts of the relay 2 can drop off under the influence of vibrations, impacts, shocks or any other external inference effects, when the electric control current and, thus, also the electric holding power are adjusted to too low a value. In order to remedy this problem, the circuit arrangement 1, described herein, also comprises at least one acceleration sensor 8, which is connected to the control and evaluating unit 6. An evaluating unit 62 for evaluating the acceleration information, provided by the acceleration sensor 8, is implemented in the control and evaluating unit 6. In this case one goal is to detect fast enough the shocks, which are currently acting on the relay 2 and could result in the relay contacts dropping off. Preferably the acceleration sensor 8 is designed such that it can measure the acceleration, acting on the circuit arrangement 1 and, thus, also on the relay 2, at a scan rate of 5 kHz. In this way, the evaluating unit 62 obtains the acceleration measurement values from the acceleration sensor 8 at time intervals of 200 μs each.

The acceleration sensor 8 is designed such that it can measure the acceleration in at least one spatial direction. This spatial direction can correlate, in particular, to the axis of the relay armature, since the acceleration, acting in this direction, is especially critical. A three axis acceleration sensor 8, which can detect the acceleration in three spatial directions that are orthogonal to each other, has proved to be particularly advantageous. The acceleration sensor 8 can be preferably a micro-electromechanical system (MEMS). According to one advantageous further development, the acceleration sensor 8 can also be designed to have nine axes and can comprise a gyroscope as well as a magnetometer. In this way particularly exact acceleration measurement values are obtained.

The evaluating unit 62 is configured such that it can determine the jerk j, currently prevailing in the region of the relay 2, by differentiating the measured acceleration values over time. For this purpose a corresponding evaluating algorithm, which can determine the jerk j by forming the first time derivative of the acceleration, is implemented in the evaluating unit 62. The control and evaluating unit 6 comprises a read only memory 63, in which a critical, relay-specific jerk threshold value $j_{krit}$ is retrievably stored.

If $j \geq j_{krit}$, then the control current, which flows through the relay coil 20, is increased by the current regulator 60, so that the electric holding power is increased in size. In this way, the relay contacts can be effectively prevented from dropping off on account of the effect of impacts, shocks, or vibrations. If, in contrast, $j < j_{krit}$, then the control current, which flows through the relay coil 20, is decrementally decreased by the current regulator 60, so that the holding power is reduced. The decrease in the control current is carried out no longer than until a relay-specific, minimally allowable holding current $I_{Min}$, which may not be undershot, is reached. In the event that the jerk j were to reach or exceed the critical jerk threshold value $j_{krit}$, then the current flow through the relay coil 20 is increased again. In this context it should be noted that the relay coil 20 resists the current alterations due to the self-induction effects. The time constant $T=R/L$ of the relay coil 20, where R is the electrical resistance and L is the inductance, is not linear and also depends on the size of the current flow through the relay coil 20. In the present case the current regulator 60 forms a closed loop PI controller, in which the cumulative effect of the control deviations leads to the fact that in the final end the control deviation will become zero. Hence, a PI controller has advantageously no steady state control deviation.

It has been shown to be advantageous to use a relay 2 with a relay coil 20 that is operated with a relay voltage that is much smaller than half of the operating voltage 3 (in the present case 24 V). For example, a relay 2 having a relay voltage of 9 V can be used. At an operating voltage of 24 V the pulse duty factor (the so-called "duty cycle") of the pulse width modulation is about 30%. On detection of a jerk $j \geq j_{krit}$, the pulse width modulation is set to 100%, so that at an electric operating voltage of 24 V and a relay voltage of 9 V, it is possible to induce a high current alteration. In the event of a jerk $j \geq j_{krit}$, the electric current flow through the relay coil 20 is increased in a timely fashion by setting the pulse width modulation to 100% or by turning the pulse width modulation completely on. In this way such a jerk leads to a control deviation that the current regulator 60 immediately corrects. In the event that a current target value is reached that does not result in the relay contacts of the relay 2 dropping off due to impacts, shocks or vibrations, the current is readjusted again; and the pulse width modulation assumes smaller values.

The circuit arrangement 1 that is described herein makes it possible to drastically reduce, as compared to the manufacturer's specifications, the control current, which flows through the relay coil 20, without jeopardizing the safe working conditions. In this way the power loss and, associated therewith, also the waste heat of the relay 2 can be significantly reduced without having to associate with such a reduction any losses with respect to the reliability in the event of shocks, impacts or vibrations. Studies have shown that it is possible to reduce the control current to values that are about 50% of the holding current specified by the relay manufacturer, so that the internal temperature rise of the relay 2 can be significantly reduced.

What is claimed is:

1. A circuit arrangement comprising:
   an electronic switch;
   at least one relay including a relay coil;

a shunt resistor;

a voltage supply device to supply an operating voltage to the at least one relay, wherein the electronic switch, the relay coil of the at least one relay, and the shunt resistor are electrically connected in series to one another between the operating voltage and ground;

a current regulator to drive the electronic switch with a pulse width modulation to adjust a control current that flows through the relay coil;

at least one acceleration sensor to detect an acceleration acting on the at least one relay in at least one spatial direction and to generate sensor data indicative of shocks, impacts or vibrations acting on the at least one relay; and an evaluating unit to evaluate the sensor data to determine a jerk (j) prevailing in a region of the at least one relay by differentiating measured acceleration values over time, wherein the current regulator is configured to adjust the control current based on the sensor data evaluated by the evaluating unit.

2. The circuit arrangement of claim 1, wherein the acceleration sensor is configured to detect the acceleration acting on the at least one relay in at least two spatial directions.

3. The circuit arrangement of claim 1, wherein the acceleration sensor is configured to detect the acceleration acting on the at least one relay in three spatial directions.

4. The circuit arrangement of claim 1, wherein the acceleration sensor includes nine axes and comprises a gyroscope and a magnetometer.

5. The circuit arrangement of claim 1, wherein the acceleration sensor has a scan rate of at least 1 kHz.

6. The circuit arrangement of claim 1, wherein the acceleration sensor has a scan rate of at least 3 kHz.

7. The circuit arrangement of claim 1, wherein the acceleration sensor has a scan rate of at least 5 kHz.

8. The circuit arrangement of claim 1, wherein the current regulator is configured to increase the control current flowing through the relay coil in response to $j \geq j_{krit}$, where $j_{krit}$ is a critical threshold value of the jerk.

9. The circuit arrangement of claim 8, wherein the current regulator is configured to decrementally decrease the control current flowing through the relay coil in response to $j < j_{krit}$.

10. The circuit arrangement of claim 1, wherein the electronic switch is a bipolar transistor.

11. The circuit arrangement of claim 1, wherein the relay coil has a coil voltage that is less than half of the operating voltage provided by the voltage supply device.

* * * * *